United States Patent
Carman, Jr. et al.

(10) Patent No.: US 7,637,882 B2
(45) Date of Patent: Dec. 29, 2009

(54) MULTIPLE USE HANDLE SUPPORT FOR DISTRIBUTING FORCES

(75) Inventors: Edward C. Carman, Jr., Boston, MA (US); Edward C. Carman, III, W. Concord, MA (US)

(73) Assignee: Advance Handle Company, LLC, Boston, MA (US)

( * ) Notice: Subject to any disclaimer, the term of this patent is extended or adjusted under 35 U.S.C. 154(b) by 1365 days.

(21) Appl. No.: 10/081,273

(22) Filed: Feb. 21, 2002

(65) Prior Publication Data

US 2002/0157215 A1 Oct. 31, 2002

Related U.S. Application Data

(60) Provisional application No. 60/345,688, filed on Dec. 31, 2001, provisional application No. 60/286,436, filed on Apr. 26, 2001.

(51) Int. Cl.
  *A61F 5/00* (2006.01)
  *B25G 3/32* (2006.01)
  *B25G 1/00* (2006.01)
  *B25G 1/10* (2006.01)

(52) U.S. Cl. ............... 602/21; 16/422; 16/426; 16/430; 81/489

(58) Field of Classification Search ........ 16/110.1, 16/422, 426, 427, 429, 430, DIG. 41, 440, 16/DIG. 12; 81/177.2, 177.1, 489, 427.5
See application file for complete search history.

(56) References Cited

U.S. PATENT DOCUMENTS

| | | | | |
|---|---|---|---|---|
| 2,482,589 A * | 9/1949 | Maguire | ............... | 294/1.1 |
| 2,710,571 A | 6/1955 | Pfister | ............... | 97/61 |
| 3,574,380 A * | 4/1971 | Tague | ............... | 294/16 |
| 4,411,284 A * | 10/1983 | Opitz | ............... | 135/81 |
| 4,822,087 A | 4/1989 | DeCarlo | ............... | 294/1.1 |
| 4,836,190 A * | 6/1989 | Zwick | ............... | 600/226 |
| 4,888,846 A | 12/1989 | Natale | ............... | 15/236.01 |
| 4,924,924 A * | 5/1990 | Stewart | ............... | 142/49 |
| 4,962,561 A * | 10/1990 | Hamilton | ............... | 15/111 |
| 4,964,430 A * | 10/1990 | Janis | ............... | 135/78 |
| 5,125,130 A * | 6/1992 | Stanish | ............... | 16/430 |
| 5,156,429 A * | 10/1992 | Adams | ............... | 294/25 |
| 5,228,610 A | 7/1993 | Spence | ............... | 224/267 |
| 5,331,989 A * | 7/1994 | Stephens | ............... | 135/65 |
| 5,379,758 A * | 1/1995 | Snyder | ............... | 600/213 |
| 5,445,479 A | 8/1995 | Hillinger | ............... | 408/16 |
| 5,455,981 A * | 10/1995 | Wiese | ............... | 15/236.01 |
| 5,471,700 A * | 12/1995 | Pereira | ............... | 15/160 |
| 5,529,357 A | 6/1996 | Hoffman | ............... | 294/58 |
| 5,564,451 A | 10/1996 | Hagberg | ............... | 135/68 |
| 5,588,903 A * | 12/1996 | Pennison | ............... | 451/344 |
| 5,716,087 A * | 2/1998 | Backich et al. | ............... | 294/55 |
| 5,802,960 A * | 9/1998 | Graj et al. | ............... | 99/403 |
| 5,832,563 A | 11/1998 | Simpson | ............... | 16/110 R |
| 5,890,259 A * | 4/1999 | Sarac | ............... | 16/422 |
| 6,082,795 A * | 7/2000 | Fornelli | ............... | 294/58 |
| 6,324,728 B1 | 12/2001 | Blankenheim | ............... | 16/431 |
| 6,711,772 B2 * | 3/2004 | Grassi | ............... | 7/158 |

* cited by examiner

*Primary Examiner*—Patricia M Bianco

(57) ABSTRACT

A handle support is constructed for removable attachment to, a tool, appliance or other implement for hand held use. The handle support includes a brace portion extending rearward in a helical form. The brace portion circumscribes an open space which is substantially conical in form.

31 Claims, 4 Drawing Sheets

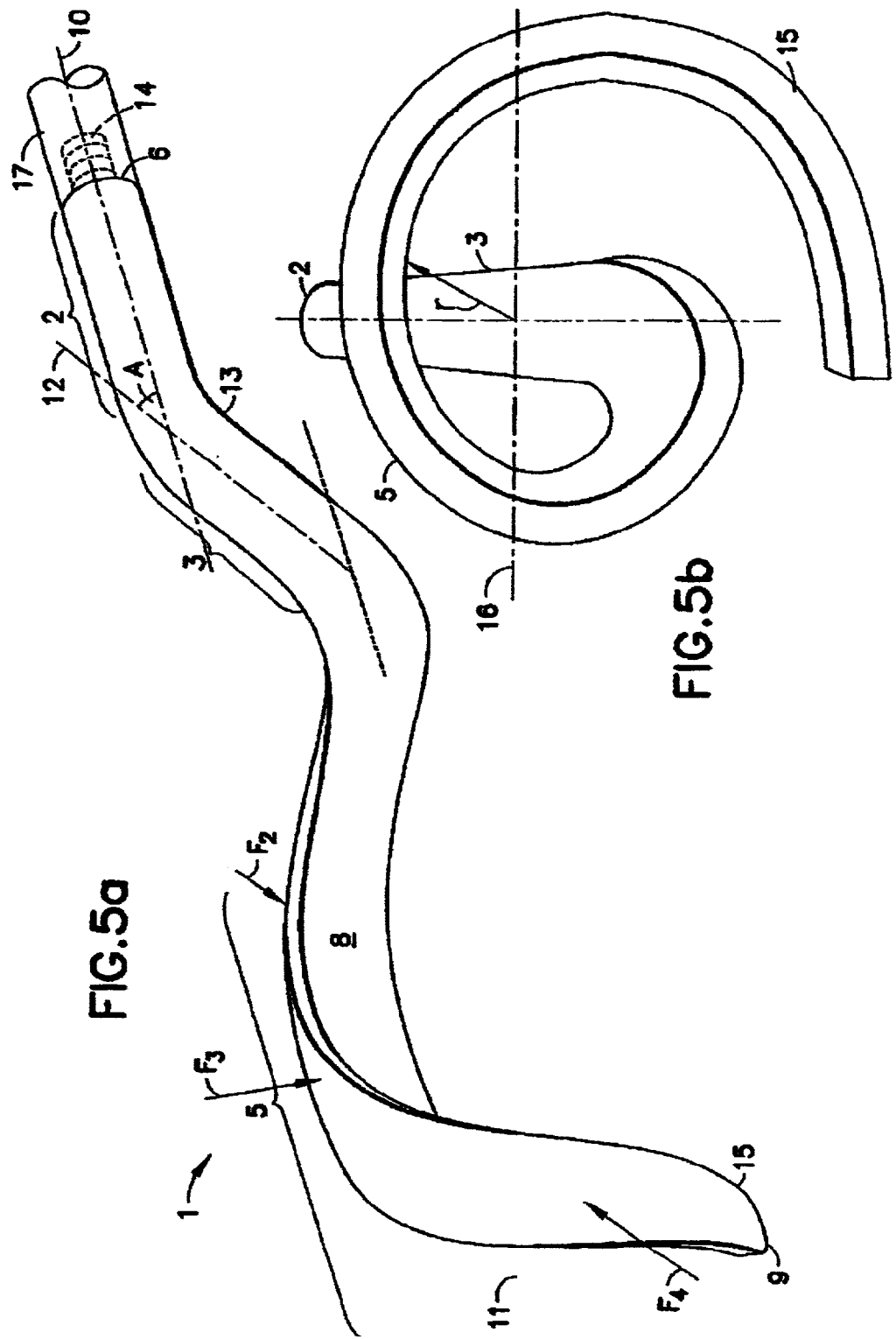

MULTIPLE USE HANDLE SUPPORT FOR DISTRIBUTING FORCES

RELATED APPLICATIONS

This application is a conversion of provisional application Ser. No. 60/345,688, filed Dec. 31, 2001 and of earlier filed provisional application Ser. No. 60/286,436 filed, Apr. 26, 2001.

BACKGROUND OF THE INVENTION

Many tools and appliances are used while being supported by one hand of the user. Such tools as brushes, paint rollers, window squeegees, scrapers, spray wands, certain brooms, shovels, rakes and the like, use elongated poles as part of their structure. It is common knowledge that when so used, such devices place a great deal of strain on the hand and wrist of the user. The long lever action of such tools amplifies the force required to be exerted by the hand and wrist of the user in order to exert a force at the working end. Torsional, lateral and axial forces must be transmitted from the hand and wrist to the device, causing awkwardness, fatigue, and sometimes injury.

The prior art is replete with efforts to distribute the forces experienced in the use of hand tools and appliances from the hand and wrist to the forearm, in order to relieve the pressure and strain on the wrist itself. A considerable number of prior art devices couple a handle with a brace of some sort which surrounds the forearm. Hence cuffs, bands, cradles, etc. are linked by a rigid structure to the handle. The handle is either integrally formed with the device or is equipped with a coupling device for more universal use. The efficacy of the prior art devices is generally defeated by the varying size and structure of the user, the diversity of stresses distributed to and from the tool, or discomfort experienced by the user. In addition, there is generally difficulty in installing the support on the forearm, which often requires the use of the other hand.

Typical structures of the prior art are shown in U.S. Pat. Nos. 5,445,479; 5,564,451; and 5,890,259. Each of these patents describe devices which employ an upright handle attached by a rigid bar or bars extending up the arm to a cuff. In each instance the cuff circumscribes the arm in a single transverse plane to engage the upper arm and distribute forces. The devices of '451 and '479 patents provide adjustable straps to accommodate different sizes, while the '259 patent appears to be one size fits all. U.S. Pat. No. 5,156,429 is an "S" shaped bar which, in the preferred embodiment, extends from a handle up the arm to provide engagement on several sides of the arm. By not fully enclosing the arm, it can accommodate different sizes and also makes it easier to mount on the arm.

It is a purpose of this invention to provide a mechanism for distributing forces and stress exerted by and on the hand and wrist to the forearm. It is another purpose of this invention to provide a brace which is designed for comfortable use by the great majority of potential users without regard to diverse arm sizes. It is also a purpose of this invention to provide a multipurpose handle which can be used in a wide variety of applications, in particular, those involving tools and appliances which have an elongated pole or shaft as part of their construction. Such devices are difficult to use effectively with one hand. It is also a purpose of this device to facilitate the installation and removal of the brace on the arm, so that it can be easily engaged without the use of the other hand, and without threading the hand and arm through a circular opening.

It is also a purpose of this invention to provide a multipurpose handle which can be used with hand tools such as power drills, nail guns, paint sprayers, etc., which may include a "pistol grip" as part of existing design and common use.

SUMMARY OF THE INVENTION

The handle support of this invention may be molded or cast from a light weight material such as plastic or aluminum, or other suitable material. It has a series of integrally formed sections extending from a forward end to a rearward end. The forward end forms an attachment post to which some sort of a tool is removably secured by appropriate means. A grip portion extends downward from the attachment post at an angle to allow the grip to be conveniently held by the user's hand. In the preferred embodiment, a generally planar seat portion, which may be contoured to the shape of the wrist, extends rearward from the grip portion at an obtuse angle to form a forward leaning Z-shaped front end to the handle support of this invention. A brace portion extends rearward from the planar seat in a helical form which varies in pitch and increases in radius of curvature from front to rear. The brace portion thereby circumscribes an open space which is substantially conical in form. The handle support of this invention, therefore, includes a portion which forms a helical wrap for engagement with the arm and a portion which allows the removable attachment of a variety of tools. In this manner forces, exerted by or on the hand and wrist, are distributed over the interior surface of the helical brace portion as needed.

DESCRIPTION OF THE DRAWING

The invention of this application is described in more detail below with reference to the drawing in which:

FIG. 5a is a perspective view of an alternate embodiment of the invention; and

FIG. 5b is an end view of the alternate embodiment of FIG. 5a.

DESCRIPTION OF THE PREFERRED EMBODIMENT

Figure 1:
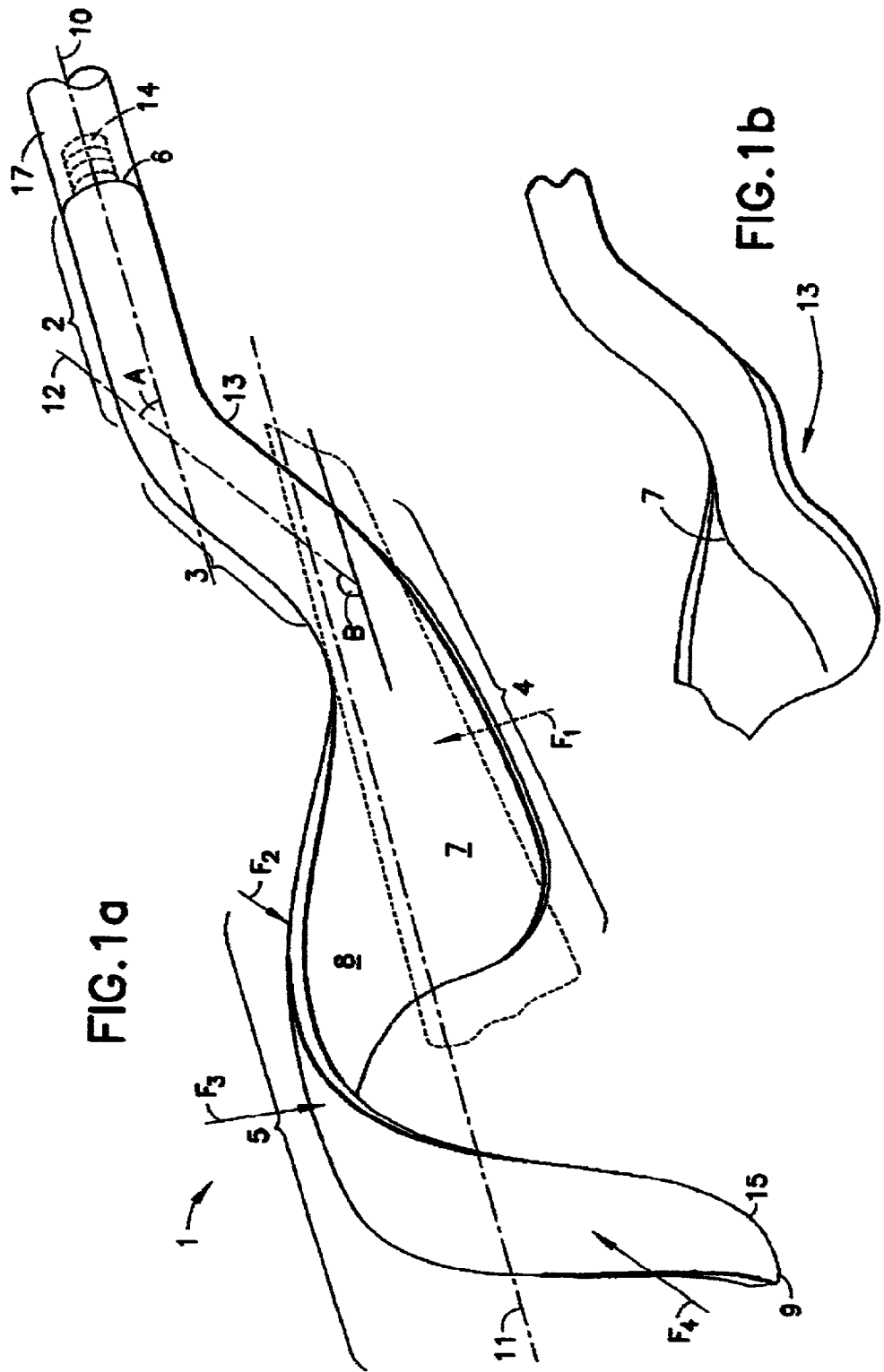
FIG. 1a is a perspective view of the handle support of this invention.
FIG. 1b is a partial view of an alternate embodiment of the seat portion of the handle support.
Figure 2:
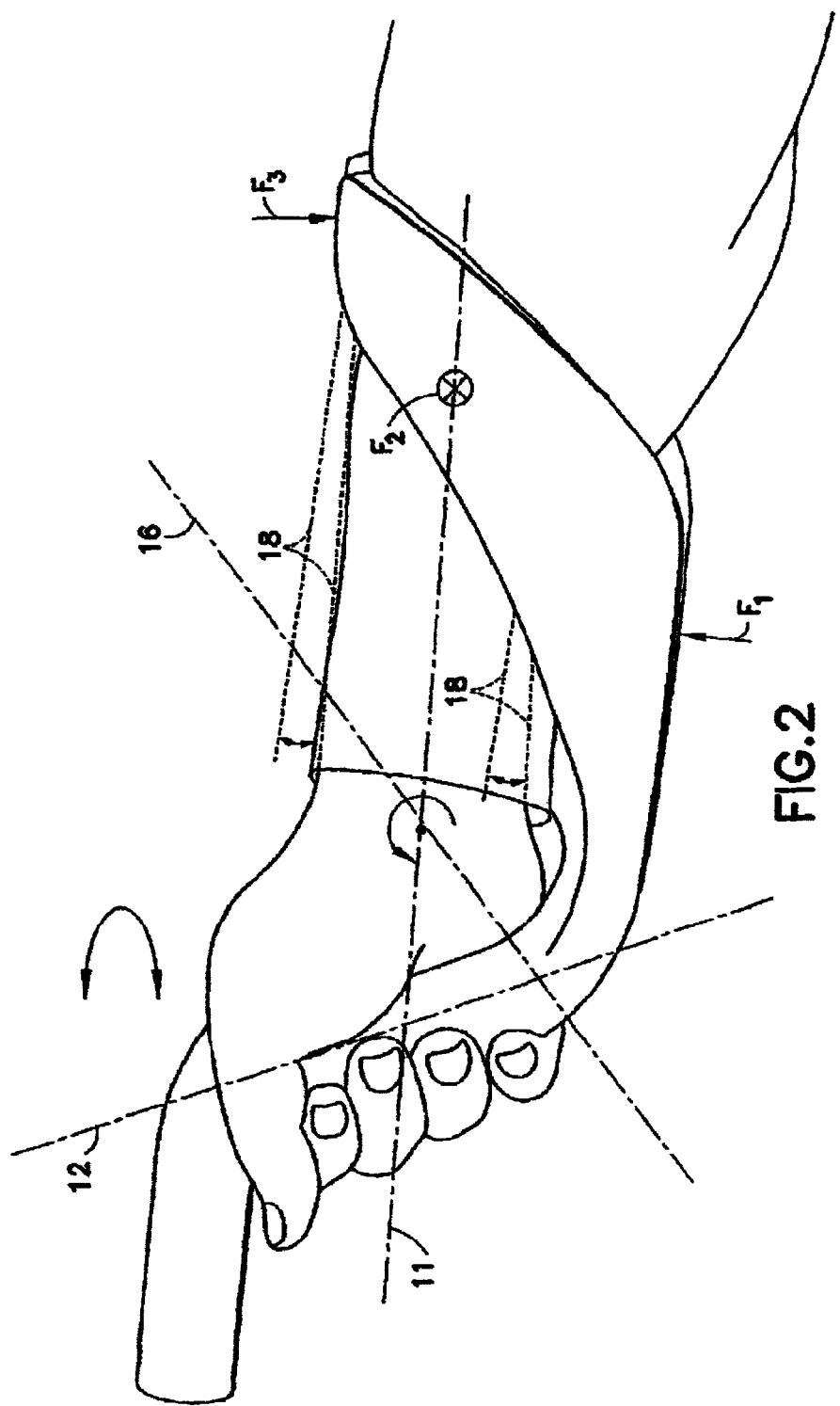
FIG. 2 is a side view of the handle support of this invention in place on the arm of the user.
Figure 3:
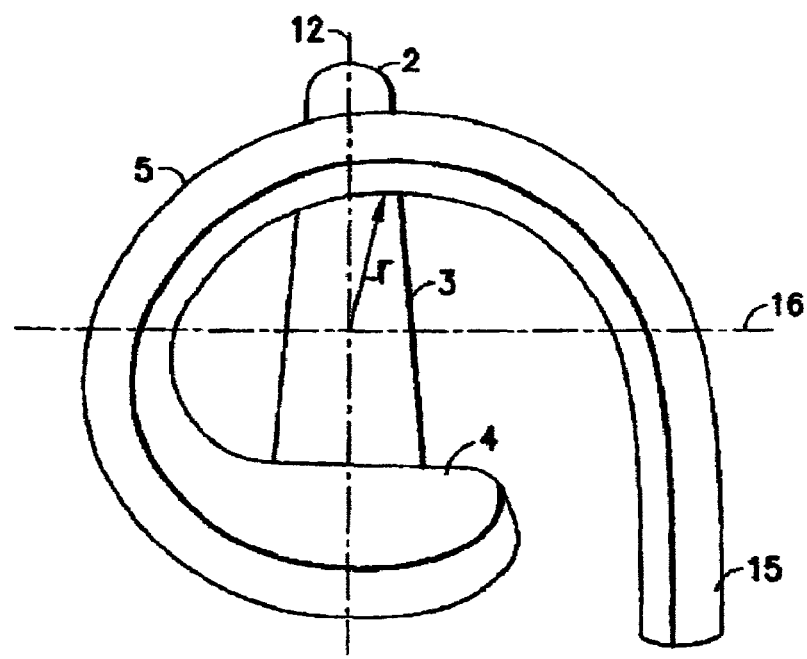
FIG. 3 is a view from the rearward end of the handle support of this invention.

As shown in FIG. 2, the handle support of this invention is a cast or molded, one piece rigid device constructed of a strong plastic material or light weight metal, such as aluminum. It has a uniquely contoured body 1 extending from a forward end 6 in front of the hand of the user to a rearward end 9 near the elbow of the user. Body 1 is integrally formed of multiple sections. At its forward end 6 there is an attachment post 2 which extends rearward. The attachment post 2 may be a generally elongated cylindrically shaped section to which is fixed a coupling mechanism 14 at the forward most end 6. The coupling mechanism is designed to facilitate the attachment of the attachment post 2 to a shaft 17 of a tool (not shown). The coupling mechanism 14 could be a variety of configurations from a simple male fitting with coarse threads, as shown in FIG. 1a, to a female receptacle with a compression nut, to a keyless chock, or a special purpose chock, depending on the tool or appliance with which it is intended to be coupled. The attachment post 2 has a longitudinal axis 10. A coupling mechanism 14, such as a female receptacle with a compression nut or a keyless chock, would facilitate the use of the handle support with a great variety of tools having cylindrical shaped handles, for example, a broom, rake, crutch, squeegee, ice scraper, paint roller and many others.

Extending rearward from the attachment post 2, is a grip 3 which may be contoured for comfortably accommodating fingers and thumb. The grip 3 also is an elongated section and has a longitudinal axis 12 which is oriented at an angle A with respect to the longitudinal axis 10 of the attachment post 2. The sections of the handle support of this invention will be described for convenience in terms of the upright orientation of the handle support in which the axis 10 of the attachment post 2 is considered generally horizontal and the grip 3 extends downward with its axis 12 at an angle A to the axis 10. It has been found that angle A should be an acute angle to provide a comfortable orientation of the tool or appliance and to conform to the shape of the hand and wrist.

A generally planar seat portion 4 extends rearward from the grip 3 to form a contoured surface 7 for supporting engagement with the lower portion of the hand and wrist, as shown in FIG. 1*a*. As shown in FIG. 1*b*, the seat portion 4 may be contoured in a slightly curved shape 13 to enable the joint of the wrist to engage the surface and flex comfortably. This provides a support if needed for applying a force F1, as shown in FIGS. 1*a* and 2. The plane of the seat forms an obtuse angle B with the axis 12 of the grip 3. The angles A and B have a relationship which is substantially supplementary to form a forward leaning Z shaped portion of the handle support. An open area above the seat portion 4 accommodates the wrist joint of the user and permits a flexing of the joint from side to side about an axis approximately parallel to axis 12, but rearward at the wrist joint, as shown in FIG. 2. The wrist joint is also free to flex up and down about axis 16 of the wrist joint. When it flexes down, it can bear on the contoured planar surface 7 of the seat 4, thereby forcing or pulling down the segment of the helix over the top of the forearm, and locking in the forearm and wrist to the helix.

A rigid brace portion 5 extends from the seat 4 to the rearward end 9 of the body 1 in a substantially helical form having a varying pitch and sufficient length to surround the arm over the top and on at least two sides. Pitch of the helix 5, which is the distance between adjacent turns of the helix measured along a line parallel to its axis 11, decreases, with a concomitant increase in helix angle, as the helix extends rearward to end 9. Although a helix is generally associated with a cylindrical form, i.e., a straight line wrapped around a cylindrical form, the helix of this device, in the preferred embodiment, circumscribes a generally conical form in which the radius of curvature "r" of the brace portion 5 diminishes form the rearward end 9 to the seat portion 4. In this manner, the brace portion 5 defines an open area in the general shape of a cone having a longitudinal axis 11. The conical open area conforms generally to the shape of the human forearm. The brace portion 5 terminates in a straight downward §15 at the rearward end 9. The short straight §15 provides an opening to allow the convenient insertion of the arm during use of the handle support, without threading the arm and hand from the rear of the handle support, and without requiring the use of the other hand for adjustment of a cuff strap, or for support of the handle device during the insertion of the arm.

In the preferred embodiment, the helix extends in a clockwise sweep starting essentially at the inner side of the wrist. The helical brace would be effective if accomplished in the reverse, i.e., extending in a counter clockwise sweep starting essentially at the outside of the wrist, according to the right arm shown in FIG. 2. It has been found that, although the handle of the preferred embodiment can be used on either arm, the clockwise sweep around the inner arm is more suitable for right hands, while a counter clockwise sweep will be more comfortable for use in the left hand.

It is observed from the figures, that the handle support will provide supporting engagement with the arm of the user over a continuous surface 8 which touches the lower, upper, and sides of the arm of the user. This engagement may not occur simultaneously, but depending on the size of the arm of the user will occur as needed. This is because, even if the handle is loose on the user's arm, the contours of the handle support allow the user freedom to flex the wrist. This allows the hand to twist around the axis 12 of the grip 3 and also to flex about a horizontal axis 16 transverse to the longitudial axis 11 of the handle support 1. Such movement will adjust the position of the brace and seat to engage the surface of the arm in an area at which supporting transmission of the forces is most comfortable. In operation, the forces needed to be exerted on the working end of the tool are distributed about the contours of the seat and brace portions 4 and 5 respectively of the handle support wherever it engages the arm. This is illustrated by force vectors $F_1$-$F_4$, as shown in FIGS. 1 and 2.

In some applications it may be advantageous to eliminate the seat section 4 so that the brace section 5 extends rearward directly from the grip portion 2. In this alternative embodiment there may be no support for the bottom of the hand, but it would be less restrictive to movement of the hand if needed for a particular use. In this instance as shown in FIG. 5*a* and 5*b*, the helical shaped brace maybe extended further around the arm in order to provide support under the arm at the segment of the brace closest to the elbow.

The support of this invention could also be adapted for use as part of a hand held tool or appliance, part of which includes a grip. In such applications a handle support including a seat and brace or just a brace could be attached or integrally constructed with the grip to function as indicated above.

Although the open area circumscribed by the brace portion 4, is desirably in conical form, the parameters of the helix could be adjusted to define a different shape, including a cylindrical shape, which may advantageous for particular purposes.

It also may envisioned that it may be advantageous to connect the attachment post to a position on the grip that is at its lower end or between the ends of the grip.

Figure 4:
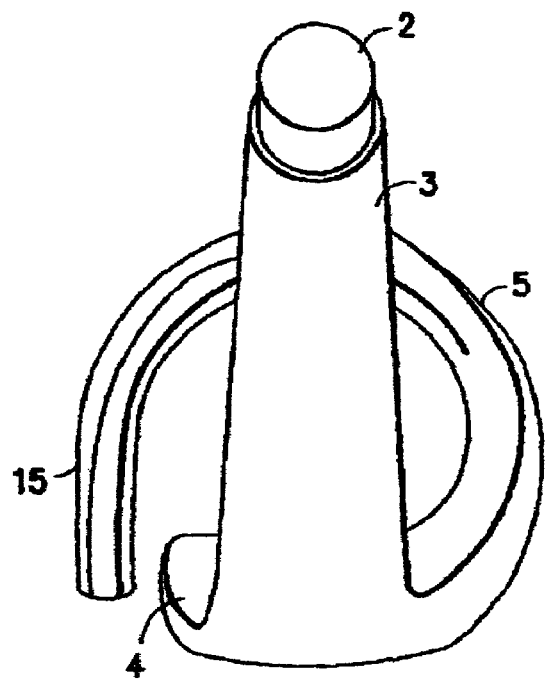
FIG. 4 is a view from the forward end of the handle support of this invention.

In operation, the helical shape of the brace of the subject handle has an axis 11 which is approximately parallel to axis 10 of the attachment post. In the preferred embodiment, as shown on FIG. 4, the helix stops short of completing a full circle around the theoretical cone that is being traversed. The axis of a user's arm, with the support handle 1 installed, is in general alignment with the axis of the cone, as shown in FIG. 2. Since the conical open area circumscribed by the helix is designed to be larger than the average wrist and forearm, the interior surface 8 of the helix will not engage the wrist and arm over its entire length at any one time. As forces are distributed, the wrist will flex to compensate for any clearance between the helical brace portion 5 and the arm. The flexing of the wrist will cause the axis of the arm to become slightly out of alignment with the axis 11 of the conical space, as shown by phantom lines 18 in FIG. 2, thereby causing engagement between the arm and the brace at different points along the length of the interior surface 8 of brace section 5 and at different points about the circumference of the arm.

Engagement will occur according to the user's sense of comfort, as controlled by wrist flexure. It is observed from use, that the surface of engagement is dependent on the direction of forces exerted at the end of the shaft 17. This action also has the effect of compensating for size of the user's arm, namely, flexure of the wrist permits engagement of the arm within the brace section 5 in spite of clearances caused by smaller sized arms. When the wrist is flexed and the brace is engaged, the relationship of the brace to the wrist becomes locked, effectively transmitting forces away from the wrist to the point of engagement with the forearm.

Therefore, the operation of the helically shaped brace 5 is considerably different than the operation of the cuffs of the prior art and results in improved comfort while efficiently distributing the forces involved to the arm to ease the burdens on wrist and hand. In addition, if rapid disengagement is required for safety or other reasons, the handle support will simply fall off the arm once the grip is released.

In this manner a handle support is constructed for efficiently and comfortably distributing forces from the wrist and hand of a user of a hand held tool or appliance to the forearm. This is accomplished by a structure which is designed to fit the size of the majority of users and provides easy installation on the arm. It should be clear that this invention can be adapted to improve the performance and ease of use of a wide variety of tools, appliances and implements.

We claim:

1. A handle for one-handed ergonomic manipulation of a tool, the tool being detachably connectable to the handle, comprising:
    the handle having forward and rearward ends;
    an attachment post at the forward end of the handle, the post having a first longitudinal axis;
    a connector at the forward end of the post, constructed to releasably attach a tool or the like to the handle;
    a grip fixed to the attachment post, the grip having a second longitudinal axis extending transverse to the first axis in a pistol-grip configuration;
    a seat portion fixed to the grip and extending rearward therefrom to underlie the bottom of the user's wrist when the grip is grasped without restraining side-to-side flexure of the wrist; and
    a band-like, elongate brace integral with and extending from one side of the seat portion, the brace extending rearwardly and in a continuous helix that wraps progressively and, in cooperation with the seat portion, defines a substantially complete revolution about an open space to accommodate and surround the lower arm of the user, from the wrist to the rearward end of the device.

2. An ergonomic handle according to claim 1, wherein said open space circumscribed by said brace has a conical shape.

3. An ergonomic handle according to claim 1, wherein said attachment post, said grip, said seat, and said brace are integrally formed as sections of a body.

4. An ergonomic handle according to claim 1, wherein said first and second axes intersect in an acute angle.

5. An ergonomic handle according to claim 4, wherein said second axis and the seat intersect at an angle which is supplementary to said acute angle.

6. An ergonomic handle according to claim 1, wherein said helix is constructed with a helix angle that increases from forward to rearward.

7. An ergonomic handle according to claim 1, wherein said helix is constructed with a radius of curvature that increases from forward to rearward.

8. An ergonomic handle according to claim 1, wherein said brave is constructed with a substantially straight portion at its distal end to provide additional space for insertion of the arm into said conical space.

9. An ergonomic handle, according to claim 1, wherein said brace is oriented so that the wrist is free to flex to allow the hand to twist on said grip about said second axis.

10. An ergonomic handle, according to claim 1, wherein said brace is oriented so that the wrist is free to flex about a third axis displaced rearward of said second axis and transverse thereto.

11. An ergonomic handle, according to claim 1, wherein said brace is oriented so that the wrist is free to flex to allow the hand to twist on said grip about said second axis and to flex about a third axis displaced rearward of said second axis and transverse thereto, said flexing operating to lock the wrist and forearm into engagement with the brace to distribute forces away from the wrist.

12. An ergonomic handle, according to claim 1, wherein said seat is substantially flat from forward to rearward.

13. A handle for one-handed ergonomic manipulation of a tool, the tool being detachably connectable to the handle, comprising:
    the handle having forward and rearward ends;
    an attachment post at the forward end of the handle, the post having a first longitudinal axis;
    a connector at the forward end of the post, constructed to releasably attach a tool or the like to the handle;
    a grip fixed to the attachment post, the grip having a second longitudinal axis extending transverse to the first axis in a pistol-grip configuration;
    a band-like, elongate brace integral with and extending transversely to one side of the grip, the brace extending rearwardly and in a continuous helix that wraps progressively and for a substantially complete revolution to define an open space to accommodate and surround the lower arm of the user, from the wrist to the rearward end of the device.

14. An ergonomic handle, according claim 13, wherein said open space circumscribed by said brace has a conical shape.

15. An ergonomic handle, according to claim 13, wherein said attachment post, said grip, and said brace are integrally formed as sections of a body.

16. An ergonomic handle, according to claim 13, wherein said first and second axes intersect in an acute angle.

17. An ergonomic handle, according to claim 13, wherein said helix is constructed with a helix angle that increases from forward to rearward.

18. An ergonomic handle, according to claim 13, wherein said helix is constructed with a radius of curvature that increases from forward to rearward.

19. An ergonomic handle, A device according to claim 13, wherein said brace is constructed with a substantially straight portion at its rearward end to provide additional space for insertion of the arm into said conical space.

20. An ergonomic handle, according to claim 13, wherein said brace is oriented so that the wrist is free to flex to allow the hand to twist on said grip about said second axis.

21. An ergonomic handle, according to claim 13, wherein said brace is oriented so that the wrist is free to flex about a third axis displaced rearward of said second axis and transverse thereto.

22. An ergonomic handle, according to claim 13, wherein said brace is oriented so that the wrist is free to flex to allow the hand to twist on said grip about said second axis and to flex about a third axis displaced rearward of said second axis and transverse thereto, said flexing operating to lock the wrist and forearm into engagement with the brace.

23. In combination with a hand-held tool having a pistol grip, a brace to facilitate one-handed ergonomic manipulation of the tool, the brace comprising:

the brace having a forward end and a rearward end;

the forward end of the brace being attached to the pistol grip, the rearward portion of the brace comprising a band-like, elongate member in the form of a continuous helix that wraps progressively and for a substantially complete revolution to define an open space to accommodate and surround the lower arm of the user.

24. The combination according to claim 23, further comprising a seat portion fixed to said grip and extending rearward therefrom transverse to the grip and extending between said grip and said brace.

25. The combination according to claim 24, wherein said brace and seat are integrally formed with said grip.

26. The combination according to claim 23, wherein said open space circumscribed by said brace has a conical shape.

27. The combination according to claim 23, wherein said helix is constructed with a pitch that decreases from forward to rearward.

28. The combination according to claim 23, wherein said helix is constructed with a radius of curvature that increases from forward to rearward.

29. The combination according to claim 23, wherein said brace is constructed with a substantially straight portion at its distal end to provide additional space for insertion of the arm into said conical space.

30. The combination according to claim 23, wherein said brace is oriented within the device so that the wrist is free to flex to allow the hand to twist on said grip.

31. The combination according to claim 23, wherein said brace is oriented within the device so that the wrist is free to flex about an axis displaced rearward and transverse of said pistol grip.

* * * * *